Oct. 16, 1956    R. C. WINTERBOTTOM    2,767,376
MICROWAVE FREQUENCY STANDARD
Filed Aug. 19, 1955

INVENTOR.
ROSS C. WINTERBOTTOM,
BY
Henry Heyman
ATTORNEY.

United States Patent Office 2,767,376
Patented Oct. 16, 1956

2,767,376

MICROWAVE FREQUENCY STANDARD

Ross C. Winterbottom, Los Angeles, Calif., assignor to Hughes Aircraft Company, Culver City, Calif., a corporation of Delaware Application August 19, 1955, Serial No. 529,393

6 Claims. (Cl. 324—81)

This invention relates to microwave measuring instruments and in particular to a microwave frequency standard containing novel highly stable means against which microwave generators may be calibrated in the field.

It has been the practice to calibrate microwave generators by reference to the output of a resonant cavity to which the unknown wave is applied. Stabilization of such resonant cavity wavemeters has been the result of extremely careful design and use of appropriate materials of low temperature coefficient.

Alternative methods of frequency measurement have employed quartz crystal oscillators with appropriate harmonic generators wherein the unknown microwave frequency is heterodyned against the appropriate harmonic in a mixer. The measurement is completed by interpolation of the unknown frequency between appropriate harmonics in a calibrated radio receiver.

The use of quartz crystal reference frequency equipment for microwave measurements involves considerable auxiliary equipment which limits any field use of such apparatus. Some of the auxiliary equipment are temperature stabilizing apparatus and ovens, harmonic generating frequency multipliers and the previously mentioned calibrated radio receiver.

In the above-mentioned quartz crystal methods the calibration of an unknown microwave frequency is accomplished against a secondary standard of frequency.

The resonant cavity type wavemeter previously mentioned represents a tertiary standard and is seldom rechecked even against secondary standards. In fields use such a wavemeter is subject to barometric and temperature changes, or accidental mechanical shifting of calibrated dials, or physical distortion of critical parts of the wavemeter. Corrosion is another factor which may impair the accuracy of such resonant cavity devices.

This invention contemplates a resonant cavity absorption type wavemeter incorporating means for primary standard calibration at microwave frequencies. An embodiment of the invention includes a gas-filled cavity tunable by means external to the cavity and having additional tuning means represented by a diaphragm forming a side of the cavity, or a tuning plunger driven by a moving magnetic coil or similar device. The resonant frequency may be cyclically varied about the mean resonant frequency of the gas-filled cavity by the movement of the diaphragm or plunger.

The wavemeter of this invention is applied in a manner similar to other absorption cavity wavemeters. The wavemeter is first calibrated as follows: A wide band source of signals such as a "noise" generator is connected to the input of the cavity and a detector is connected to output of the cavity. The output of the detector is connected to the vertical deflection circuit of an oscilloscope. The magnetic diaphragm driver is connected to a source of signals to cyclically vary the diaphragm, or plunger, and thus the resonant frequency of the cavity. The same signal source is also connected to the horizontal deflection circuit of the oscilloscope to act as a sweep signal generator. As the gas-filled system is varied by its tuning means during the cyclic variation of the diaphragm it is adjusted so that the sweep of the diaphragm tunes across the molecular resonance frequency of the gas in the cavity.

The molecular resonance frequency of a gas has come to be known as its absorption line. This term will be used throughout in this connection.

The particular absorption line or lines of a known gas may be used as a standard or reference because such lines are fixed and invariant insofar as present research in the field of microwave spectroscopy has been able to define. The selection of a gas for the chamber of the cavity of this invention is determined by the desired calibration range. Ammonia gas, for example, has its major absorption bands in the 1.2 cm. microwave region. All of these bands are not of the same strength but may be adjusted by control of the isotopic mixtures of hydrogen and nitrogen used to form the ammonia gas.

The microwave absorption lines of gases, reported by investigators to date, fall outside currently used microwave radar and communication frequencies. It is still possible to make use of the principles of this invention for measurement of frequencies in the currently used bands, such as the 3 cm. microwave region. The 3 cm. waves are applied to semiconductor or other non-linear elements from which harmonics are produced in an appropriate molecular resonance region. This technique is used over a wide frequency range and over several harmonically related ranges. In any case, a gas having the appropriate molecular resonance bands would be used in the chamber of the resonant cavity.

Accordingly, it is an object of this invention to provide a microwave frequency standard which uses as a reference the molecular resonance frequency or absorption line of a gas in the desired region of the microwave spectrum.

It is a further object of this invention to provide a microwave frequency standard comprising a resonant chamber incorporating means for cyclically varying its resonant frequency, a noise generator, a detector, and indicating means.

It is yet another object of this invention to provide a means for measuring microwave frequencies by comparison on an indicating means of the frequency to be measured with the molecular resonance frequency or absorption line of a gas.

It is a still further object of this invention to provide a microwave measuring system comprising a gas-filled resonance cavity which is cyclically varied about the molecular resonance frequency or absorption line of the gas, a means for indicating the difference between a frequency to be measured and the molecular resonance frequency as a standard.

These and other objects of this invention will be more thoroughly understood with reference to the specification and claims which follow, taken together with the drawings which illustrate a preferred, but not limited, embodiment of this invention.

Figure 1:
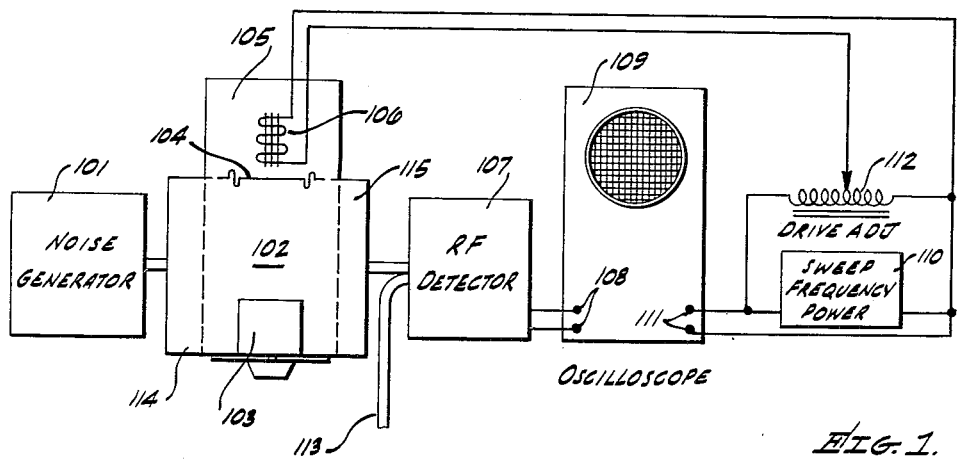
Fig. 1 is a partial block and schematic diagram of the microwave frequency standard of this invention.

Referring now to Fig. 1, a source of noise signals 101 is shown connected to a gas-filled cavity resonator 102. Cavity resonator 102 has a micrometer tuning arrangement 103 in one face for varying the resonant frequency of the cavity to some fixed position, and a diaphragm 104 which may be varied. Coupled to the diaphragm 104 is a magnetic drive system 105 which, when excited by an appropriate A.-C. signal, causes diaphragm 104 to vary position and the resonant frequency of the cavity in accordance with the alternating current applied to the magnetic coil 106 of the drive system 105. A microwave detector 107 is connected to the output of gas-filled cavity resonator 102. Detector 107 is coupled to the vertical deflection input 108 of an oscilloscope 109. A source of sweep signals 110 is coupled to the horizontal input 111 of the oscilloscope 109. A drive adjustment output device 112 is connected to the sweep frequency signal source 110 and thence to magnetic coil 106 of the drive system 105.

Figure 2:
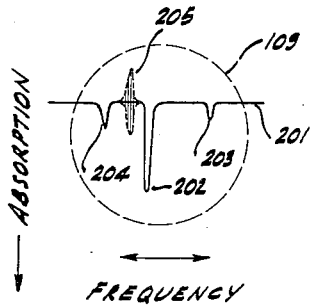
Fig. 2 is a waveform diagram of a typical sweep response curve of the molecular absorption bands of a gas, as displayed on an oscilloscope.

Referring now to Fig. 2, the appearance of a display as seen on the oscilloscope 109 (see Fig. 1) is shown. The scale of Fig. 2 in the abscissa represents the resonant frequency as the cavity 102 is cyclically varied. The ordinate scale indicates microwave detector 107 output amplitude which is the resonant cavity output signal as modified by absorption. The deeper the dip in the waveform, the greater the absorption of the microwave energy by the gas in the cavity at that frequency. The waveform 201 shows a major absorption line 202 and a pair of minor absorption lines 203 and 204, respectively. As the diaphragm 104 is cyclically varied by magnetic drive system 105, the resonant frequency of cavity 102 will vary in accordance with the variation in the dimensions of the cavity. Any microwave energy at frequencies corresponding to the then resonant frequency of the cavity will pass through the cavity to produce a signal in microwave detector 107. This signal is applied to vertical deflection input 108 of oscilloscope 109. Should one of these microwave frequencies correspond with an absorption line of the gas in the cavity 102, then there will be a reduction in the output to detector 107. Such reductions in output are illustrated in the negative-going dips of waveform 201, shown at 202, 203 and 204.

Figure 3:
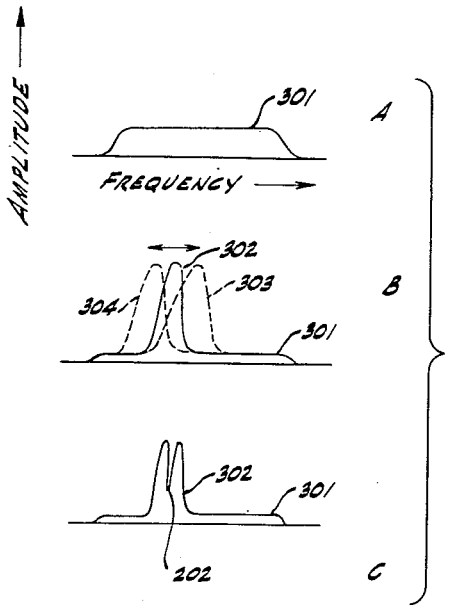
Fig. 3 is a series of waveform diagrams illustrating a typical response curve of the microwave frequency meter for a frequency under test.

By referring now to Fig. 3, the method by which the system of this invention may be used for the measurement of unknown microwave frequencies can be more fully understood. The waveforms of Fig. 3, designated as A, B and C, respectively, show in each case a signal frequency versus amplitude plot.

In Fig. 3A, the detected envelope output waveform 301 of a noise source such as 101 over some predetermined wide band of frequencies is indicated.

In Fig. 3B, there is superimposed over the noise pattern waveform 301 the cavity resonance response 302. In dashed lines at 303 and 304, respectively, the variation in the position of waveform 302 is shown as tuning element 103 of cavity 102 is varied, or alternatively, as the dimensions of cavity 102 may be varied by the cyclic movement of diaphragm 104.

In Fig. 3C, the effect of a molecular absorption line 202 falling within the resonance peak of the cavity is shown.

The waveforms 301 of Fig. 3 correspond to waveform 201 of Fig. 2 if considered as the output of detector 107 as it responds to the output of the resonant cavity 102 at progressive instants in the frequency sweep generated by the action of cavity tuning diaphragm 104.

By adjustment of the frequency sweep drive control 112 the range of frequencies swept can be reduced, thereby expanding the presentation of a narrower range over the face of the oscilloscope indicator and allowing a more accurate setting of the tuning control mechanism 103 so as to establish the central point in the absorption line for accurate calibration of the wavemeter. The adjustment of tuning control 103 results in the shifting of the absorption line wave pattern appearing on the oscilloscope. Thus, it is possible to locate the desired line of the absorption pattern with respect to the tuning mechanism with great accuracy. Standing alone, the device and its operation described hereinabove, represents a standard of reference for the measurement of a frequency within the range of the absorption lines of the gas within the cavity 102. An input connection 113 (see Fig. 1) for an external signal, may be provided for microwave detector 107. The unknown frequency to be measured may thus be applied to detector 107 and would produce a characteristic heterodyne pattern such as the dotted waveform 205 of Fig. 2. The wavemeter tuning device 103 has been so arranged that the scale of the oscilloscope may be calibrated to indicate the frequency of the waveforms as they appear on oscilloscope 109. Thus, it may be anticipated that knowning the frequency of the absorption lines as indicated at 202 and 203 and 204 appearing on the oscilloscope along with the unknown frequency, the exact frequency of the waveform 205 may readily be determined. The unknown frequency being applied at external input terminals 113 may be the output of a directly generated microwave signal at a fundamental frequency, or it may be the integral harmonic of some lower frequency. In the event that the unknown frequency being applied to input connection 113 is a harmonic of some lower frequency, an appropriate computational division would have to be made.

What is claimed as new is:

1. A microwave frequency meter comprising a gas-filled resonant cavity having an input circuit and an output circuit, said cavity having a resonant range within the microwave molecular absorption bands of the gas which fills the cavity and having an adjustable fixed tuning means and cyclically variable tuning means; a microwave noise source coupled to said input circuit of said cavity for applying microwave energy thereto; a microwave detecting means having a first input circuit coupled to said output circuit of said cavity and a second input circuit, said detecting means being adapted for generating a characteristic signal in response to microwave frequencies applied thereto from said cavity and to any unknown signal applied to said second input circuit; an indicating means coupled to said detecting means; means for driving said cyclically variable tuning means coupled to said cyclically variable tuning means; and a source of alternating current signals coupled to said driving means for energizing said driving means and coupled to said indicating means for synchronizing said indicating means with said cyclically variable tuning means, whereby said indicating means displays a characteristic signal waveform by which the unknown signal applied to said second input circuit may be compared with the characteristic molecular absorption signals displayed thereon.

2. A microwave frequency meter comprising a resonant cavity having an input circuit and an output circuit, said cavity being resonant within a predetermined microwave band of frequencies applied to the cavity, and having an adjustable fixed tuning means and cyclically variable tuning means; a microwave noise source coupled to said input circuit of said cavity for applying microwave energy thereto; a microwave detecting means having a first input circuit coupled to said output circuit of said cavity and a second input circuit, said detecting means being adapted for generating a characteristic signal in response to microwave frequencies applied thereto from said cavity and to any unknown signal applied to said second input circuit; an indicating means coupled to said detecting means; means for driving said cyclically variable tuning means coupled to said cyclically variable tuning means; and a source of alternating current signals coupled to said driving means for energizing said driving means and to said indicating means for synchronizing said indicating means with said cyclically variable tuning means, whereby said indicating means displays a characteristic signal waveform by which the unknown signal applied to said second input circuit may be compared with the characteristic resonant frequency of the cavity.

3. A microwave frequency measuring system comprising a resonant cavity having an input circuit and an output circuit, said cavity being resonant within a predetermined microwave band of frequencies applied to the cavity and having an adjustable fixed tuning means and cyclically variable tuning means; a microwave noise source coupled to said input circuit of said cavity for applying microwave energy thereto; a gas-filled absorption chamber coupled to the output circuit of said cavity; a microwave detecting means having an input circuit coupled to the output circuit of said gas absorption chamber, said detecting means being adapted for generating a characteristic signal in response to microwave frequencies applied thereto from said cavity through said gas-filled absorption chamber; an indicating means coupled to said detecting means; means for driving said cyclically variable tuning means coupled to said cyclically variable tuning means; and a source of alternating current signals coupled to said driving means for energizing said driving means and to said indicating means for synchronizing said indicating means with said cyclically variable tuning means, whereby said indicating means displays a characteristic signal waveform by which said resonant cavity can be calibrated against the characteristic gas absorption lines.

4. A microwave frequency measuring system comprising: a microwave noise source; a source of a gas having molecular resonance lines with the microwave region, said gas source being coupled to said microwave noise source; a resonant cavity coupled to said gas source and adapted for receiving said microwave noise through said gas source, said cavity having a resonant range within the microwave molecular absorption bands of the said gas source and having an adjustable fixed tuning means and cyclically variable tuning means; a microwave detecting means having an input circuit coupled to the output circuit of said cavity, said detecting means being adapted for generating a characteristic signal in response to microwave frequencies applied thereto from said cavity; an indicating means coupled to said detecting means; means for driving said cyclically variable tuning means coupled to said cyclically variable tuning means; and a source of alternating current signals coupled to said driving means for energizing said driving means and to said indicating means for synchronizing said indicating means with said cyclically variable tuning means, whereby said indicating means displays a characteristic signal waveform by which said resonant cavity can be calibrated against the characteristic gas absorption lines.

5. A microwave frequency meter comprising a gas-filled resonant cavity having an input circuit and an output circuit, said cavity being dimensioned to have a resonant range within the microwave molecular absorption bands of the gas which fills the cavity and having an adjustable fixed tuning means and cyclically variable tuning means; a microwave noise source coupled to said input circuit of said cavity for applying microwave energy thereto; a microwave detecting means having an input circuit coupled to said output circuit of said cavity, said detecting means being adapted for generating a characteristic signal in response to microwave frequencies applied thereto from said cavity; an indicating means coupled to said detecting means; means for driving said cyclically variable tuning means coupled to said cyclically variable tuning means; and a source of alternating current signals coupled to said driving means and to said indicating means for synchronizing said indicating means with said cyclically variable tuning means, whereby said indicating means displays a characteristic signal waveform by which the adjustable fixed tuning means may be calibrated by comparison with the characteristic molecular absorption signals displayed thereon.

6. A microwave frequency measuring system comprising: a microwave noise source; a gas-filled resonant cavity, coupled to said noise source, said cavity having an adjustable tuning device for setting the quiescent, fixed, resonant frequency of said cavity and also having a tuning device for cyclically varying the resonance of said cavity about said quiescent resonant frequency; said magnetically-driven tuning device having a dynamic driving coil, a sweep voltage generator; an oscilloscope, said sweep voltage generator being coupled to said magnetically driven tuning device for exciting said dynamic driving coil; said sweep voltage generator being also coupled to said oscilloscope to provide a horizontal sweep deflection voltage therefor in synchronism with the variation of said cavity; and a microwave detector coupled between said cavity and said oscilloscope for generating a first vertical deflection voltage in response to noise signals in the range of the molecular resonance frequence of the gas which fills said cavity, said detector having an additional input circuit for connection to an external source of unknown mircowave frequency, and also responsive to the unknown frequency for developing a second vertical deflection voltage, whereby said second deflection voltage may be compared with said first deflection voltage on said oscilloscope for the measurement of the frequency of said unknown microwave frequency.

References Cited in the file of this patent

UNITED STATES PATENTS 2,745,014     Norton _____ May 8, 1956

OTHER REFERENCES

"Electronic Design" January 1, 1956, pp. 42 and 43.